United States Patent
Bach et al.

(10) Patent No.: US 9,971,322 B2
(45) Date of Patent: May 15, 2018

(54) LOCK-OUT OPERATION FOR APPLIANCES

(71) Applicant: General Electric Company, Schenectady, NY (US)

(72) Inventors: James Carter Bach, Seymour, IN (US); Anthony Michael Shaw, Chattanooga, TN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 398 days.

(21) Appl. No.: 14/806,089

(22) Filed: Jul. 22, 2015

(65) Prior Publication Data

US 2017/0023256 A1    Jan. 26, 2017

(51) Int. Cl.
| | |
|---|---|
| *G06F 17/00* | (2006.01) |
| *G05B 15/02* | (2006.01) |
| *G06F 3/0484* | (2013.01) |
| *F24C 7/08* | (2006.01) |
| *F24C 15/10* | (2006.01) |

(52) U.S. Cl.
CPC .............. *G05B 15/02* (2013.01); *F24C 7/083* (2013.01); *F24C 15/106* (2013.01); *G06F 3/04847* (2013.01)

(58) Field of Classification Search
CPC ........ G05B 15/02; F24C 7/083; F24C 15/106; G06F 3/04847
USPC ........................................................ 700/90
See application file for complete search history.

(56) References Cited

U.S. PATENT DOCUMENTS

| 4,453,068 A | 6/1984 | Tucker et al. | |
|---|---|---|---|
| 4,845,594 A * | 7/1989 | Wilkerson | ............... H02H 3/48 361/71 |
| 4,994,934 A * | 2/1991 | Bouhenguel | ............. H02H 3/07 361/71 |
| 8,223,131 B2 | 7/2012 | Rudolph et al. | |
| 2012/0100492 A1* | 4/2012 | Hodapp, Jr. | ............ F23N 5/242 431/12 |

\* cited by examiner

*Primary Examiner* — Long K Tran
(74) *Attorney, Agent, or Firm* — Dority & Manning, P.A.

(57) ABSTRACT

Methods for operating appliances, as well as appliances such as cooktop appliances, are provided. A method includes locking the appliance such that user inputs to a user interface assembly of the appliance are prevented from altering operation of the appliance. The method further includes activating an indicator light when the appliance is locked, and deactivating the indicator light after a predetermined time period from activation of the indicator light when the appliance is locked.

20 Claims, 4 Drawing Sheets

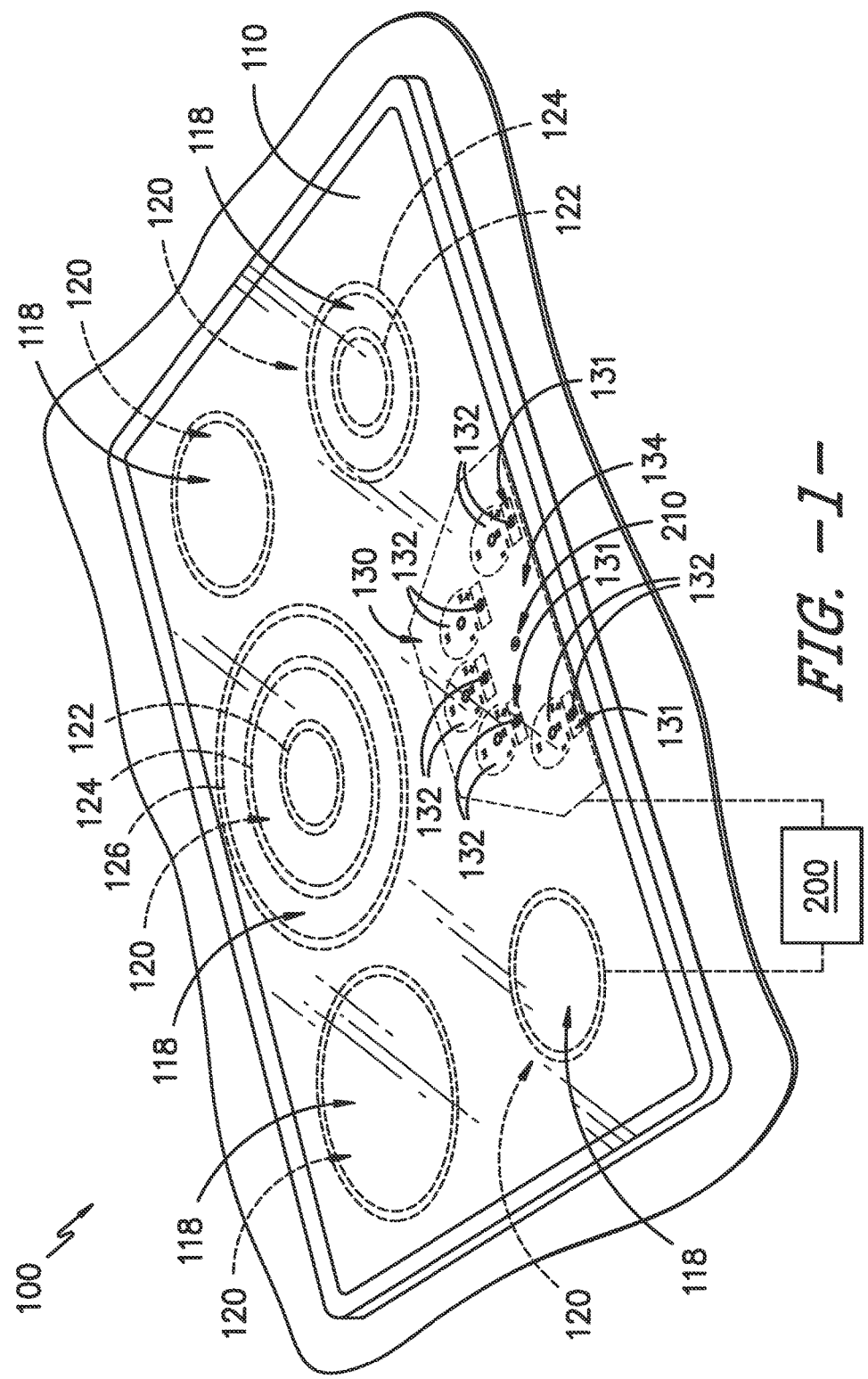
FIG. -1-

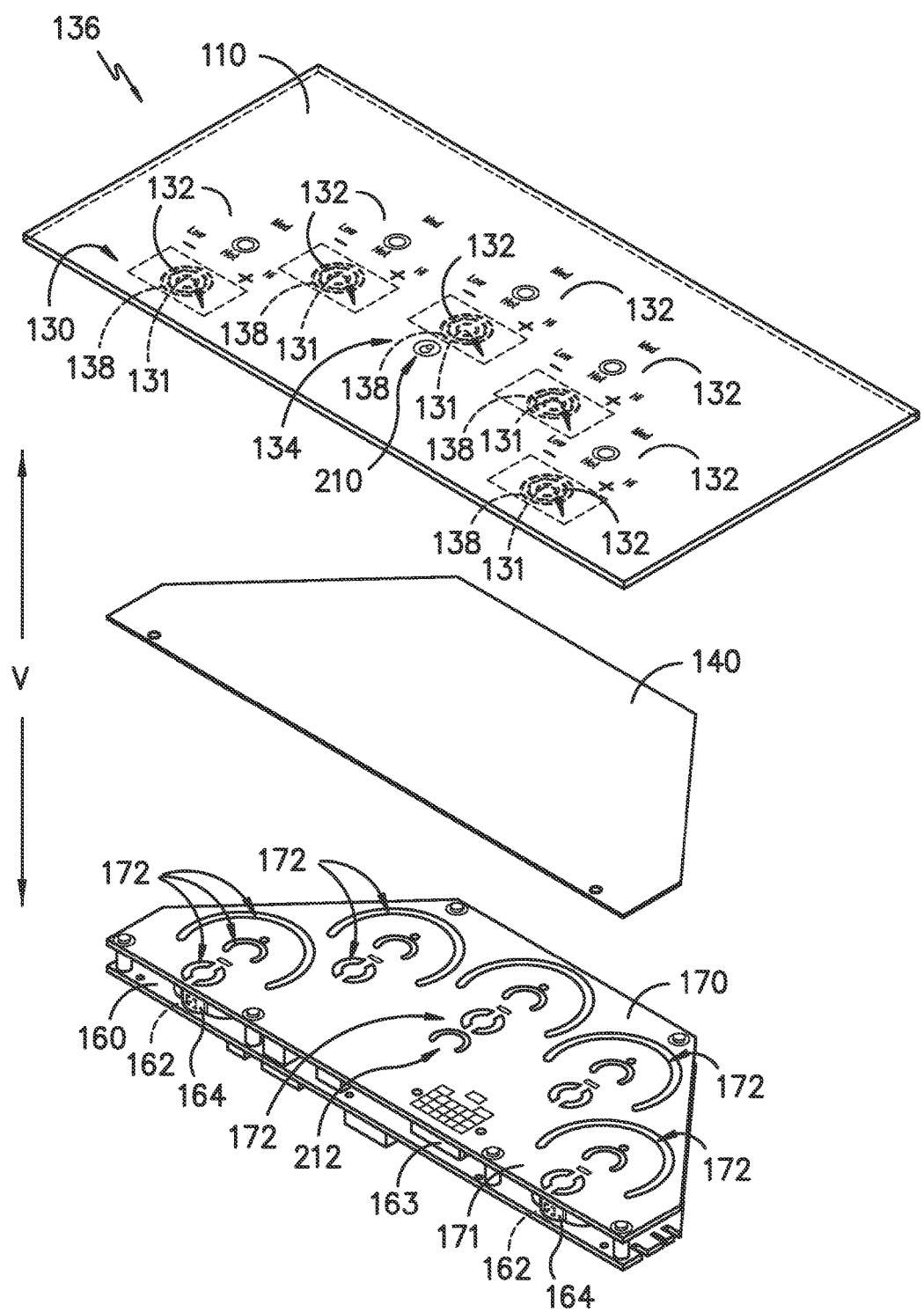
FIG. -2-

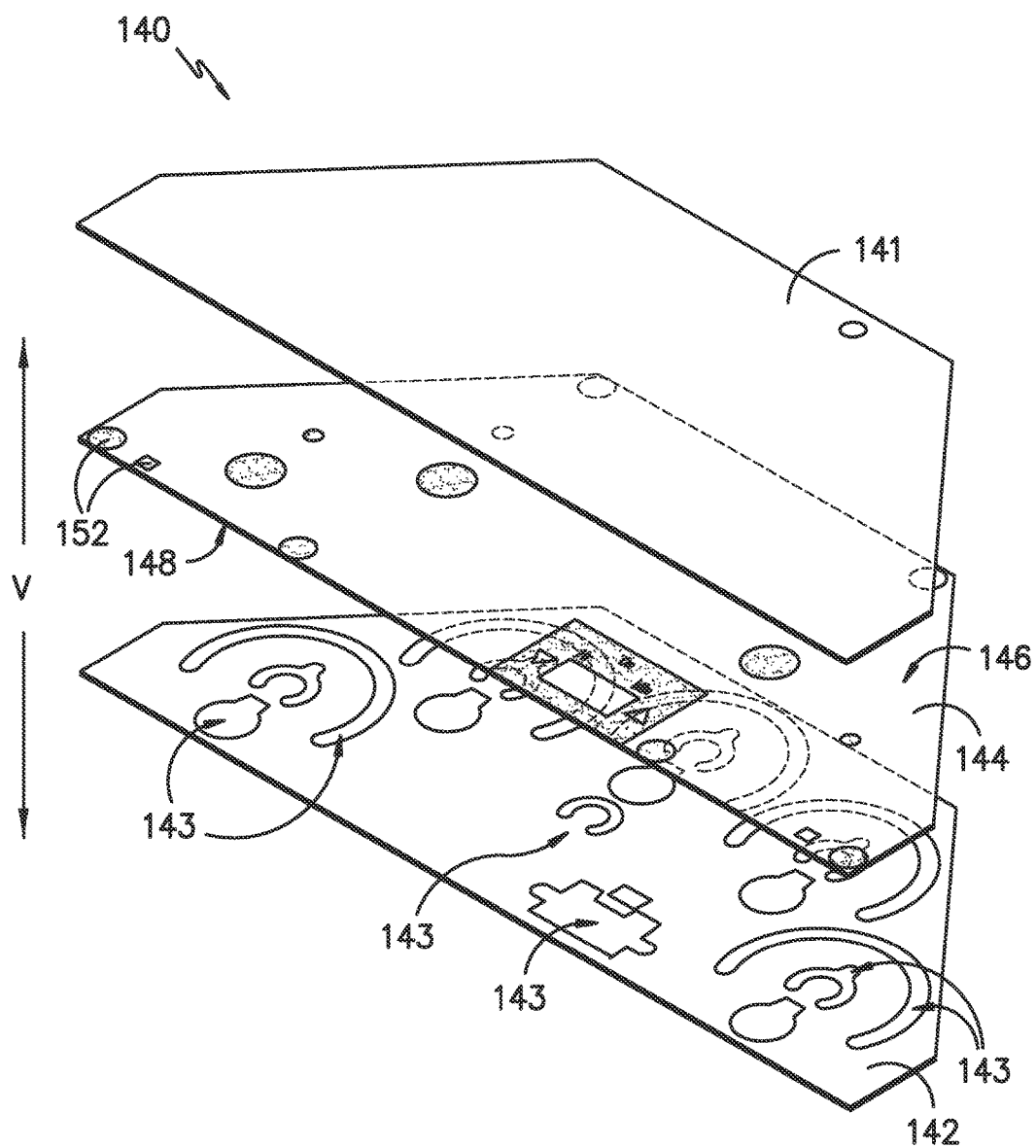
FIG. -3-

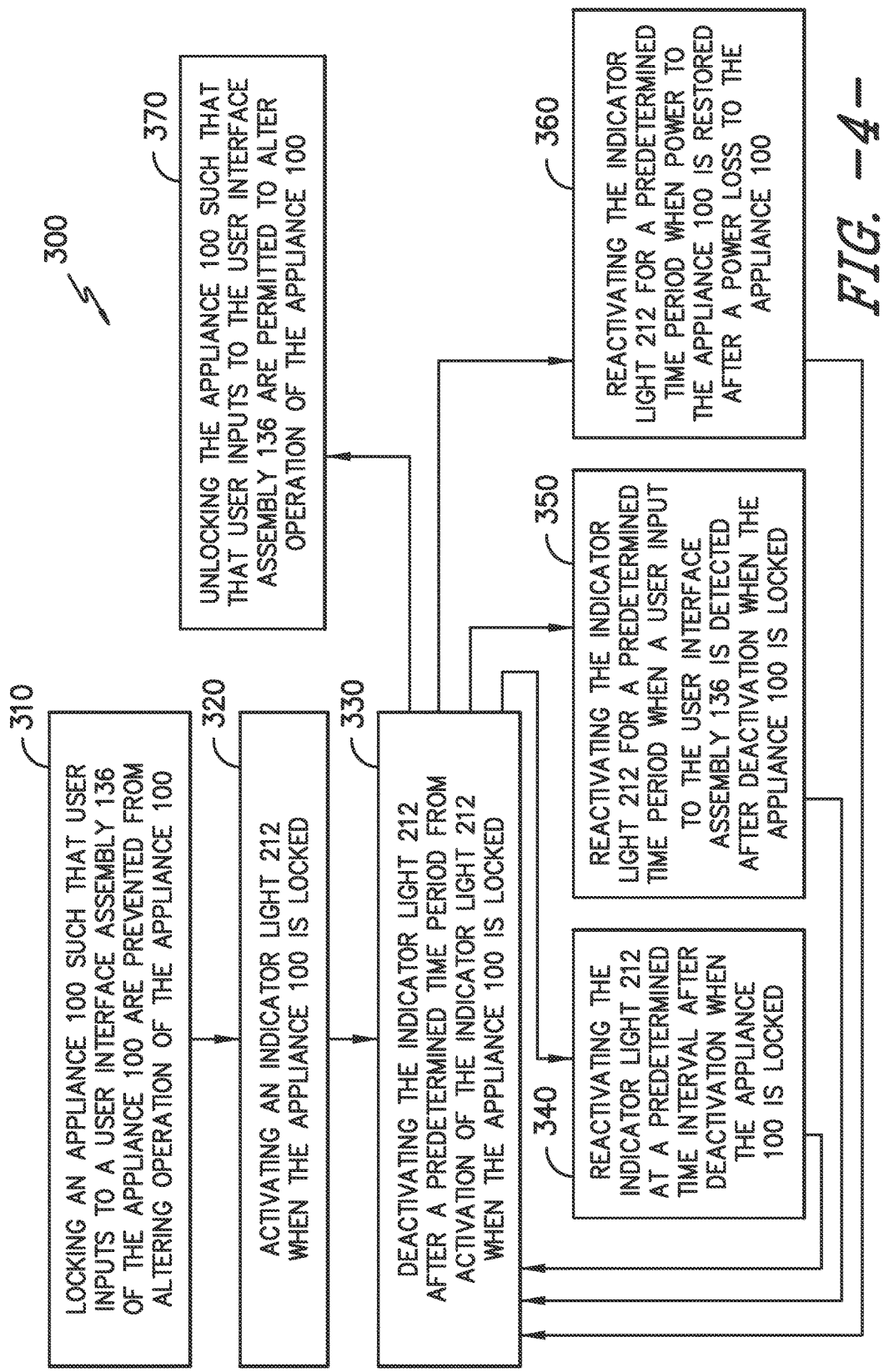

LOCK-OUT OPERATION FOR APPLIANCES

FIELD OF THE INVENTION

The present disclosure relates generally to appliances, such as cooktop appliances, and more particularly to improved lock-out features for such appliances.

BACKGROUND OF THE INVENTION

Households and offices generally include a variety of appliances for performing a variety of functions. For example, a household may include a refrigerator appliance, a dishwasher appliance, a microwave appliance, a cooktop appliance, a washer appliance and/or a dryer appliance. Cooktop appliances, for example, typically can include a variety of configurations. As an example, cooktop appliances may use a glass and/or ceramic-glass cooking panel for supporting cooking utensils. For such cooktop appliances, the heating sources can include, e.g., radiant, induction, and gas on glass. A variety of controls can be provided for the heating sources such as, e.g., traditional rotatable knobs and/or electronic types that rely on sensitivity to a user's touch. These controls may be provided as part of a user interface assembly for controlling various operations of the cooktop appliance.

One feature that is frequently included on many appliances, such as in particular cooktop appliances but also for example refrigerator appliances and other suitable appliances, is a lock-out feature. The lock-out feature, when activated, generally prevents user inputs by a user to the user interface assembly of the appliance from altering the operation of the appliance. For example, in the case of a cooktop appliance, activation of a lock-out feature may prevent a user input from activating a heat source. In a refrigerator appliance, activation of a lock-out feature may prevent a user input from changing the temperature in a freezer compartment and/or fresh food compartment.

Frequently, when a lock-out feature is activated, an indicator light on the appliance is activated to indicate that the lock-out feature is active. These lights remain on while the lock-out feature is activated. However, such use of indicator lights may have drawbacks. For example, the constant active state of an indicator light can be a distraction to a user in the vicinity of the appliance, particularly at night. Further, the constant active state of the indicator light can draw the attention of, for example, children to the light and the appliance. This can cause the children to become curious and play with the user interface assembly of the appliance, potentially unlocking the appliance and altering operation of the appliance. Accordingly, there may be safety concerns associated with such use of continuously illuminated indicator lights.

Accordingly, improved appliances and methods for operating appliances are desired. In particular, appliances and methods which provide improved lock-out features which reduce indicator light distraction and safety concerns would be advantageous.

BRIEF DESCRIPTION OF THE INVENTION

In accordance with one embodiment, a method for operating an appliance is provided. The method includes locking the appliance such that user inputs to a user interface assembly of the appliance are prevented from altering operation of the appliance. The method further includes activating an indicator light when the appliance is locked, and deactivating the indicator light after a predetermined time period from activation of the indicator light when the appliance is locked.

In accordance with another embodiment, a cooktop appliance is provided. The cooktop appliance includes a cooking panel comprising a cooking zone, and a plurality of heating elements positioned adjacent the cooking zone for heating a cooking utensil disposed on the cooking zone. The cooktop appliance further includes a user interface assembly, and a controller in communication with the user interface assembly and each of the plurality of heating elements. The controller is configured for locking the appliance such that user inputs to a user interface assembly of the appliance are prevented from altering operation of the appliance. The controller is further configured for activating an indicator light when the appliance is locked, and deactivating the indicator light after a predetermined time period from activation of the indicator light when the appliance is locked.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a top perspective view of a cooktop appliance in accordance with one embodiment of the present disclosure;

FIG. 2 provides an exploded view of a user interface assembly in accordance with one embodiment of the present disclosure;

FIG. 3 provides an exploded view of a light transmissive layer in accordance with one embodiment of the present disclosure; and FIG. 4 provides a flow chart illustrating a method for operating an appliance in accordance with one embodiment of the present disclosure.

Use of the same reference numerals in different figures denotes the same or similar features.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to appliances and methods for operating appliances which include improved lock-out features. In particular, in accordance with the present disclosure, indicator lights which indicate that an appliance is locked will automatically deactivate after being activated, due to locking of the appliance, for a predetermined time period. Such deactivation may advantageously reduce or eliminate any visual distractions associated with activation of the indicator lights, and may further reduce or eliminate any associated safety concerns. Further, in some embodiments, such deactivated indicator lights may be reactivated for predetermined time periods for various reasons, such as if a user contacts a user interface assembly of the appliance, as desired at a predetermined interval, and/or when power is restored after an appliance power loss. Appliances in accordance with the present disclosure in exemplary embodiments may utilize electrical-based user interface assemblies, which may for example include touch-screen components, and which may further in some embodiments include capacitive touch sensor components. Alternatively, however, mechanical-based user interface assemblies, electromechanical-based user interface assemblies, and other suitable user interface assemblies may be utilized. A user interface assembly in accordance with the present disclosure may advantageously include an input feature(s) for locking and unlocking the appliance.

FIG. 1 provides a top, perspective view of a cooktop appliance 100 according to an exemplary embodiment of the present subject matter. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops, which are generally known as surface cooking appliances. It should be understood that the present disclosure is not limited to cooktop appliances 100, and rather that any suitable appliance having a user input assembly and which includes a lock-out feature with an indicator light is within the scope and spirit of the present disclosure.

Cooktop appliance 100 includes a cooking panel 110 for supporting thereon cooking utensils such as pots or pans. Cooking panel 110 is a generally transparent material that may be constructed from, e.g., glass, ceramics, and/or combinations thereof.

Cooking panel 110 may include one or more cooking zones 118. As shown in FIG. 1, cooking zones 118 may be generally circular in shape and may have various diameters. For example, each cooking zone 118 can have a different diameter, the same diameter, or any suitable combination thereof. In other embodiments, cooking zones 118 may be generally rectangular in shape, and each cooking zone 118 may have the same length and width, a different length and width, or any suitable combination thereof. In still other embodiments, cooking zones 118 may have any suitable shape and size, and in some embodiments, cooking panel 110 may include cooking zones 118 of various shapes and sizes, e.g., a combination of circular and rectangular cooking zones 118. Further, while shown with five cooking zones 118 in the exemplary embodiment of FIG. 1, in alternative exemplary embodiments, cooktop appliance 100 may include any number of cooking zones 118.

A heating assembly 120 is mounted below cooking panel 110 adjacent each cooking zone 118 such that heating assemblies 120 are positioned below cooking panel 110, e.g., along a vertical direction V. Each heating assembly 120 may comprise a single heating element or a plurality of heating elements or sub-elements, such as a first heating element 122, a second heating element 124, and/or a third heating element 126 as shown in FIG. 1, with each heating element or sub-element contributing to the power density of the respective cooking zone 118. For each heating assembly having more than one heating element, heating elements 122, 124, and/or 126 may be activated individually or in conjunction with one or both of the other heating elements 122, 124, 126. For example, for a given heating assembly 120, first heating element 122 may be activated individually, with second heating element 124, with third heating element 126, or with both second heating element 124 and third heating element 126. As an additional example, for a heating assembly 120 comprising two heating elements, such as first heating element 122 and second heating element 124, both heating elements 122, 124 may be activated individually or simultaneously. Thus, using heating assemblies 120 having multiple heating elements, cooking zones 118 may vary in size and/or power density.

Cooktop appliance 100 is provided by way of example only and is not limited to the exemplary embodiment shown in FIG. 1. For example, a cooktop appliance having one or more heating assemblies in combination with one or more electric or gas burner heating elements can be provided. In addition, various combinations of number of heating assemblies, position of heating assemblies, and/or size of heating assemblies can be provided. Moreover, heating assemblies 120 can have a variety of constructions for the input of energy in the form of heat to the cooking utensils. For example, heating assemblies 120 can be constructed as electric radiant or gas-on-glass heating sources. Mechanisms associated with each such type of heating source are positioned under cooking panel 110 adjacent cooking zones 118 and will be well understood of one of skill in the art using the teachings disclosed herein.

A touch screen or touch screen 130 provides visual information to a user and allows a user to select various options for the operation of cooktop appliance 100. For example, touch screen 130 may include a selection portion 131 for each cooking zone 118, and within selection portion 131, a user may select which heating element or elements of the associated heating assembly 120 the user desires to be activated and information may be displayed to the user such as, e.g., which heating element or elements is active and/or at what size or power density has been selected for cooking zone 118. More particularly, as shown in the exemplary embodiment of FIG. 1, touch screen 130 includes one or more capacitive touch input components 132, which can be used as part of a capacitive touch sensing system 171 (FIG. 2) to allow for the selective activation, adjustment, or control of any or all heating assemblies 120. Touch input components 132 may also be provided for the selective activation, adjustment, or control of any timer features or other user adjustable inputs. One or more of a variety of electrical, mechanical or electro-mechanical input devices including rotary dials, push buttons, toggle/rocker switches, and/or touch pads can also be used singularly or in combination with touch input components 132. Touch screen 130 also includes a display component 134, such as a digital or analog display device designed to provide operational feedback to a user. Selection portion 131 of touch screen 130 is further described below.

Touch screen 130 can be any type of input device and can have any configuration. In FIG. 1, touch screen 130 is located within a portion of cooking panel 110. Alternatively, touch screen 130 can be positioned on a vertical surface near a front side of cooktop appliance 100 or anywhere convenient for a user to access during operation of cooktop appliance 100. In some embodiments, cooktop appliance 100 may be a range cooktop, and in such embodiments, touch screen 130 may be positioned on, e.g., a backsplash of the range.

Also, although described with respect to cooktop appliance 100, it should be readily understood that touch screen 130 as described herein could be used with any suitable appliance. When used with other appliances, such as, e.g., washing machine appliances, dryer appliances, and/or refrigerator appliances, panel 110 may be constructed of glass, ceramics, plastics, and/or combinations thereof. Suitable plastic materials may include acrylics, polyethylene terephthalate ("PET"), or the like. In some embodiments, touch screen 130 may be incorporated into or may form the control panel of an appliance; for example, touch screen 130 may be incorporated into a backsplash of a washing machine or dryer appliance.

Operation of cooktop appliance 100 can be regulated by a controller 200 that is operatively coupled, i.e., in communication with, touch screen 130 and heating assemblies 120, including first heating elements 122, second heating elements 124, and third heating elements 126. For example, in response to user manipulation of a touch input component 132, the controller operates one of heating assemblies 120, e.g., by operating one or more of heating elements 122, 124, 126. The controller is also provided with other features. By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 200 may be positioned in a variety of locations throughout cooktop appliance 100. In the illustrated embodiment, the controller may be located under or next to the touch screen 130. In such an embodiment, input/output ("I/O") signals are routed between the controller and various operational components of appliance 100 such heating assemblies 120, touch input components 132, sensors, graphical displays, and/or one or more alarms. In one embodiment, the touch screen 130 may represent a general purpose I/O ("GPIO") device or functional block. Touch screen 130 may be in communication with the controller via one or more signal lines or shared communication busses.

FIG. 2 illustrates an exploded view of a user interface assembly 136 of cooktop 100. As shown, a user of cooktop appliance 100 may input and receive information regarding the operation of cooktop 100 at touch screen 130, which is a portion of cooking panel 110. A variety of text, digits, and/or symbols may be printed on touch screen 130 to indicate, e.g., the operation of a cooking zone 118 or the area of touch screen 130 to touch to input certain information. In alternative embodiments, no text, digits, or symbols may appear on touch screen 130 unless cooktop 100 is in use.

As shown in FIG. 2, a first printed circuit board 160 is positioned below touch screen 130 along the vertical direction V. First printed circuit board 160 may include a plurality of light sources 162 for illuminating touch screen 130. Each light source may be, e.g., a light emitting diode ("LED"), an incandescent lamp, or any other appropriate light source. First printed circuit board 160 may also include other features for controlling touch screen 130 and/or cooktop appliance 100.

A second printed circuit board 170 may be positioned above first printed circuit board 160 but below touch screen 130 along vertical direction V. Second printed circuit board 170 may include a capacitive touch sensing system 171, whereby cooktop 100 is controlled at least in part through touch inputs on touch screen 130 by a user of cooktop 100, e.g., through capacitive touch input components 132. Second printed circuit board 170 may also include a plurality of apertures 172 for the passage of light from light sources 162 to touch screen 130.

As further shown in FIG. 2, a light transmissive layer 140 may be disposed between touch screen 130 and light source or sources 162. In some embodiments, light transmissive layer 140 is positioned between touch screen 130 and second printed circuit board 170. In alternative embodiments, light transmissive layer 140 may be disposed between first printed circuit board 160 and second printed circuit board 170. In still other embodiments, light transmissive layer 140 may be omitted.

FIG. 3 illustrates an exploded view of light transmissive layer 140. In some embodiments, light transmissive layer 140 is a light diffusion layer, i.e., a diffuser, that diffuses the light from light sources 162 to provide uniform lighting of the illuminated text, digits, graphics, or other features on touch screen 130. In such embodiments, light transmissive layer 140 may be, e.g., a frosted PET film. Alternatively or additionally, light transmissive layer 140 may be a graphics overlay, masking, or support layer that may be a clear layer of, e.g., a PET film for providing various graphics, such as graphic 138 described below, on touch screen 130 by passing light through layer 140. Using a masking material 152 applied to light transmissive layer 140, text, digits, and/or symbols may be formed such that the text, digits, and/or symbols are presented to the user of cooktop 100 when illuminated by light source 162. Alternatively or additionally, masking material 152 may be used to mask various features of the construction of user interface assembly 136, e.g., circuit board pads, part labels, etc., such that the features are not visible to a user of cooktop 100. Masking material 152 may be, e.g., a black ink or the like.

Light transmissive layer 140 may include a support substrate 144. As illustrated in the exemplary embodiment of FIG. 3, support substrate 144 has a first surface 146 and a second surface 148. First surface 146 faces cooking panel 110 and second surface 148 faces light sources 162. In embodiments where light transmissive layer 140 is a light diffusion layer or diffuser, support substrate 144 may be a diffusive support substrate that diffuses light passing through the substrate. Support substrate 144 may have other configurations as well.

As described, masking material 152 may be used to define various features of touch screen 130 or to mask various features of user interface assembly 136. Masking material 152 may be applied to first surface 146 of support substrate 144 or second surface 148 of support substrate 144. In alternative embodiments, masking material 152 may be applied to both first and second surfaces 146, 148. In still other embodiments, masking material 152 may be omitted.

In addition, an adhesive 141, such as, e.g., a transfer tape, may be used to bond first surface 146 of support substrate 144 to cooking panel 110, and an adhesive 142 may be used to bond second surface 148 to second printed circuit board 170. As described, in alternative embodiments, light transmissive layer 140 may be disposed between first printed circuit board 160 and second printed circuit board 170; in such embodiments, second circuit board 170 may be bonded directly to the cooking panel 110, and light transmissive layer 140 may be secured in place by alignment pins (not shown) such that a layer of adhesive 141, 142 is not needed. Each layer of adhesive 141, 142 may be composed of the same adhesive material or may be composed of different adhesive materials, e.g., an appropriate adhesive may be selected for bonding support substrate 144 to cooking panel 110 and another appropriate adhesive may be selected for bonding support substrate 144 to second printed circuit board 170. Further, as illustrated in FIG. 3, adhesive 142 may be selectively applied such that there are one or more voids 143 in layer of adhesive 142. Additionally, support substrate 144 may include one or more voids 143. Voids 143 may, e.g., aid in the assembly of light transmissive layer 140, allow light from light sources 162 to pass unimpeded through a layer of adhesive 142, or result from efficient application of adhesive 142. As appropriate, layer of adhesive 141 also may define one or more voids 143.

Referring again to FIG. 2, user interface assembly 136 may utilize one or more light guides 164 to guide light from light sources 162 toward touch screen 130 located on cooking panel 110. A light guide 164 may be positioned along the vertical direction V between first printed circuit board 160 and second printed circuit board 170. Light guides 164 may be positioned in other locations as well. Further, light guides 164 may be of any suitable size and shape for guiding light toward touch screen 130. Light guides 164 may be formed with air channels for guiding light toward touch screen 130 or light guides 164 may comprise light pipes to convey light from light source 162 to touch screen 130. In an exemplary embodiment, a light guide 164 is configured to guide light from one or more light sources 162 to touch screen 130 to produce an illuminated graphic 138 with multiple images or sub-images within a selection portion 131.

Referring again to FIG. 1, selection portion 131 may be or may include a capacitive touch input component 132. A touch input component 132 may correspond to a portion of second printed circuit board 170 such that a touch input to selection portion 131 adjacent that portion activates, deactivates, or controls one or more features, functions, or the like of cooktop 100.

More particularly, capacitive touch sensing system 171 of second printed circuit board 170 may be in operative communication with each heating assembly 120 to activate and deactivate heating elements 122, 124, 126 to vary the size and/or power density of each cooking zone 118.

Although described above as utilizing two printed circuit boards 160, 170, in an alternative exemplary embodiment, the elements of the two circuit boards may be combined such that only one printed circuit board is required. Exemplary single circuit board approaches are provided in, for example, U.S. patent application Ser. No. 14/524,310, filed on Oct. 27, 2014, and U.S. patent application Ser. No. 14/681,144, filed on Apr. 8, 2015, both of which are incorporated by reference herein in their entireties. For example, user interface assembly 136 may include touch screen 130 and first printed circuit board 160 positioned below touch screen 130 along the vertical direction V. In this exemplary embodiment, first printed circuit board includes capacitive touch sensing system 171 as described above with respect to second printed circuit board 170. Light sources 162 may be positioned on first printed circuit board 160 such that the light from light sources 162 is directed away from cooking panel 110 and touch screen 130. Further, light guide 164 may include a plurality of reflector boxes and may be held in place against the bottom surface of first printed circuit board 160 with a layer of adhesive 141, 142. The plurality of reflector boxes of light guide 164 guide from light sources 162 toward touch screen 130 by redirecting the light, i.e., the light from light sources 162 is reflected off an interior surface of the reflector boxes and thereby directed toward touch screen 130 through apertures defined by printed circuit board 160. Additionally, light transmissive layer 140 may be disposed between touch screen 130 and first printed circuit board 160 and may be held in place by one or more layers of adhesive 141, 142 as described above. First printed circuit board 160, light guide 164, light sources 162, and/or light transmissive layer 140 may be configured as previously described to display graphic 138 within selection portion 131 such that graphic 138 is co-located with a touch input component 132, and a user may select one or more operating states of cooktop appliance 100 within the area displaying a graphic indicating the operating state of appliance 100.

Referring still to FIGS. 1 and 2, one touch input component 132 may be a lock input 210, as illustrated. Contact with the lock input 210 may activate and deactivate a lock-out feature of the appliance 100. Further, an indicator light 212 may be provided. The indicator light 212 may be included in user interface assembly 136, and may for example include a light source 162, a light guide 164, and an aperture 172. Alternatively, indicator light 212 may be separate from user interface assembly 136, and may include any suitable light source. Lock input 210 and indicator light 212 may generally be in communication with controller 200 for transmitting signals to and receiving signals from controller 200.

It should be understood that the present disclosure is not limited to the above-described user interface assembly 136, and rather that any suitable capacitive-based touch assembly, other touchscreen or electronic-based touch assembly, or mechanical or electro-mechanical assembly may be utilized for user interface assembly 136. Further it should be understood that lock input 210 is not limited to the above-described embodiments, and rather that any suitable input(s) for locking and unlocking operation of an appliance is within the scope and spirit of the present disclosure.

Referring now to FIG. 4, methods 300 for operating an appliance 100 are provided. In exemplary embodiments, various steps of such methods 300 may be performed by a controller such as controller 200 as discussed above. Further, various steps of such methods 300 may be performed based on and as a result of user inputs to an input, such as a lock input, of a user interface assembly which is in communication with the controller, such as via contact by a user with the input.

Method 300 may include, for example, the step 310 of locking the appliance 100 such that user inputs to the user interface assembly 136 of the appliance 100 are prevented from altering operation of the appliance 100. When locked in accordance with step 310, changes to the operation of components of the appliance 100 other than the user interface assembly 136, such as the heating assemblies 120 of a cooktop appliance 100 or the refrigeration cycle assembly or ice-maker of a refrigerator appliance, may be prevented. Accordingly, controller 200 may receive signals from user interface assembly 136, but may not transmit signals to other components of the appliance 100 to alter their operation based on the signals from the user interface assembly 136 until the appliance 100 is unlocked.

In exemplary embodiments, locking of the appliance 100 in accordance with the present disclosure can only occur when the appliance 100 is in an inactive state. For a cooktop appliance 100 or another appliance having heating assemblies, for example, an inactive state is a state wherein all heating assemblies 120 are deactivated. For a refrigerator appliance, an inactive state is a state wherein the appliance 100 is only operating to maintain preset fresh food chamber and/or freezer chamber temperatures, with other components of the appliance being inactive. For other appliances, in exemplary embodiments, an inactive state is a state wherein components of the appliance are deactivated such that the appliance is not considered in use. In general, an appliance in an inactive state may have its components deactivated such that the appliance is not considered in use except for appliance maintenance purposes (i.e. the maintenance of a particular temperature for a refrigerator appliance as discussed above).

In some embodiments, the locking step 310 may be based on a user input to the user interface assembly 136, such as to lock input 210 thereof. For example, contact by the user with such input may send a lock signal to the controller 200, which may cause the controller 200 to lock the appliance 100 as discussed above. In some embodiments, a user may be required to maintain contact with the lock input 210 for a predetermined time period, such as greater than 1 second, greater than 2 seconds, greater than 3 seconds, etc. for such signal to be sent to the controller 200.

Additionally or alternatively, the locking step 310 may occur automatically after a predetermined time period from detection of an inactive state of the appliance 100. For example, controller 200 may include a timer which calculates time periods between signals to the controller 200 and/or after the controller 200 transmits or receives signals (i.e. until a subsequent transmission or receipt). After controller 200 transmits signals to cause the appliance 100 to be in an inactive state as discussed above, controller 200 may beginning calculating the time until the next subsequent user input to user interface assembly 136 or other user input or change in the state of the appliance 100. Upon passage of a predetermined time period without a user input or change in state, controller 200 may automatically lock the appliance 100 as discussed above. Such predetermined time period may be, for example, less than or equal to approximately 20 minutes, less than or equal to approximately 10 minutes, less than or equal to approximately 5 minutes, etc.

Additionally or alternatively, the locking step 310 may occur automatically when power to the appliance 100 is restored after a loss of power to the appliance 100. For example, appliance 100 may be in electrical communication with a suitable power source, i.e. an electrical power source. In some cases, a loss of power to the appliance 100 may occur, thus turning the appliance 100 off. Upon restoration of power to the appliance 100, the controller 200 may automatically lock the appliance 100, either immediately upon restoration of power or at some predetermined time thereafter, such as for example after 10 minutes without any intervening inputs.

Method 300 may further include, for example, the step 320 of activating an indicator light 212 when the appliance 100 is locked, such as immediately upon locking. For example, controller 200 may, upon locking of the appliance 100 as discussed above, send a signal to the indicator light 212 (such as a light source 162 thereof) to activate the indicator light 212 (i.e. the light source 162 thereof). Such activation may initially provide a visual indication that the appliance 100 is locked. If the appliance is being manually locked by the user, e.g. pressing-and-holding the lock input 210 for a predetermined time period, activation of the indicator light 212 provides visual confirmation that the "lock" command was accepted and locking has occurred.

Method 300 may further include, for example, the step 330 of deactivating the indicator light 212 after a predetermined time period from activation of the indicator light 212 when the appliance 100 is locked. For example, controller 200 may, upon activating the indicator light 212 as discussed above, beginning calculating the elapsed time. Upon passage of a predetermined time period without unlocking of the appliance 100, controller 200 may automatically send a signal to the indicator light 212 (such as a light source 162 thereof) to deactivate the indicator light 212 (i.e. the light source 162 thereof). Such activation may thus advantageously remove the visual indication that the appliance 100 is locked, reducing or eliminating associated distractions and safety concerns as discussed above. Such predetermined time period may be, for example, less than or equal to approximately 10 minutes, less than or equal to approximately 5 minutes, less than or equal to approximately 3 minutes, etc.

As discussed, indicator light 212 may in some embodiments be reactivated after deactivation when the appliance 100 is locked. For example, in some embodiments, method 300 may include the step 340 of reactivating the indicator light 212 at a predetermined time interval after deactivation when the appliance 100 is locked, each reactivation occurring for a predetermined time period. For example, controller 200 may, upon deactivating the indicator light 212 as discussed above, beginning calculating the elapsed time. Upon passage of a predetermined time interval without unlocking of the appliance 100, controller 200 may automatically send a signal to the indicator light 212 (such as a light source 162 thereof) to activate the indicator light 212 (i.e. the light source 162 thereof) for a predetermined time period. Upon cessation of this predetermined time period, the controller 200 may automatically send a signal to the indicator light 212 (such as a light source 162 thereof) to deactivate the indicator light 212 (i.e. the light source 162 thereof), and may again begin calculating the elapsed time. Such intermittent reactivation of the indicator light 212 may serve to reassure a user that the appliance 100 is indeed locked, while greatly reducing the amount of time the indicator light 212 is illuminated, thus for example, reducing the nighttime-annoyance/child-attention-getting aspects of the indicator light 212. Such predetermined time interval may be, for example, less than or equal to approximately 30 minutes, less than or equal to approximately 20 minutes, less than or equal to approximately 10 minutes, etc. Such predetermined time period may be, for example, less than or equal to 30 seconds, less than or equal to 20 seconds, less than or equal to 10 seconds, less than or equal to 5 seconds, less than or equal to 2 seconds, etc.

Additionally or alternatively, method 300 may include the step 350 of reactivating the indicator light 212 for a predetermined time period when a user input to the user interface assembly 136 is detected after deactivation when the appliance 100 is locked. For example, as discussed, when appliance 100 is locked, controller 200 may still receive signals corresponding to user inputs to user interface assembly 136. Upon receipt of such a signal, such as due to a user contacting an input such as a touch input component 132, controller 200 may automatically send a signal to the indicator light 212 (such as a light source 162 thereof) to activate the indicator light 212 (i.e. the light source 162 thereof) for a predetermined time period. Such predetermined time period may be, for example, less than or equal to 30 seconds, less than or equal to 20 seconds, less than or equal to 10 seconds, less than or equal to 5 seconds, less than or equal to 2 seconds, etc. Such as-needed reactivation of the indicator light 212 may serve as a reminder to the user that the appliance 100 is locked, and that it needs to be unlocked before user inputs will be accepted e.g. the user of the cooktop appliance 100 can't activate a heating assembly 120 without first unlocking the appliance 100.

Additionally or alternatively, method 300 may include the step 360 of reactivating the indicator light 212 for a predetermined time period when power to the appliance 100 is restored after a loss of power to the appliance 100. For example, as discussed above, in some cases power to the appliance 100 may be lost. Upon restoration of such power, as discussed above, the controller 200 may automatically lock the appliance 100, either immediately upon restoration of power or at some predetermined time thereafter, such as for example after 10 minutes without any intervening inputs. In this case, controller 200 may further automatically send a signal to the indicator light 212 (such as a light source 162 thereof) to activate the indicator light 212 (i.e. the light source 162 thereof) for a predetermined time period. in some cases, such predetermined time period may be, for example, less than or equal to 30 seconds, less than or equal to 20 seconds, less than or equal to 10 seconds, less than or equal to 5 seconds, less than or equal to 2 seconds, etc. In other cases, such predetermined time period may correspond to the initial time period that the indicator light 212 is activated during the locking step 310.

Notably, any one or more of steps 340, 350, 360 may optionally be included in a method 300 in accordance with the present disclosure. After, such step 340, 350, 360 is completed, methods 300 reverts to the deactivated state after step 330, as illustrated.

Method 300 may further include the step 370 of unlocking the appliance 100 such that user inputs to the user interface assembly 136 are permitted to alter operation of the appliance 100. In exemplary embodiments for example, unlocking of the appliance 100 is based on a user input to the user interface assembly 136, such as to the lock input 210 thereof. For example, contact by a user with the lock input 210 when the appliance 100 is locked may send an unlock signal to the controller 200 to unlock the appliance 100, and the controller 200 may unlock the appliance 100 based on such input. In some embodiments, a user may be required to maintain contact with the lock input 210 for a predetermined time period, such as greater than 1 second, greater than 2 seconds, greater than 3 seconds, etc. for such signal to be sent to the controller 200. Upon unlocking of the appliance 100, the user interface assembly 136 may be utilized normally as discussed herein to alter the operation of the various other components of the appliance 100 as discussed herein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for operating an appliance, the method comprising: locking the appliance such that user inputs to a user interface assembly of the appliance are prevented from altering operation of the appliance;
    activating an indicator light when the appliance is locked; and
    deactivating the indicator light after a predetermined time period from activation of the indicator light, the step of deactivating occurring while continuing the step of locking the appliance such that user inputs to the user interface assembly are prevented from altering operation of the appliance; and
   wherein the method further comprises
   reactivating the indicator light at a predetermined time interval after deactivation, the step of reactivating occurring while continuing the step of locking the appliance such that user inputs to the user interface assembly are prevented from altering operation of the appliance, each reactivation occurring for a predetermined time period; or
   reactivating the indicator light for a predetermined time period when a user input to the user interface assembly is detected after deactivation, the step of reactivating occurring while continuing the step of locking the appliance such that user inputs to the user interface assembly are prevented from altering operation of the appliance.

2. The method of claim 1, further comprising:
   reactivating the indicator light at a predetermined time interval after deactivation, the step of reactivating occurring while continuing the step of locking the appliance such that user inputs to the user interface assembly are prevented from altering operation of the appliance, each reactivation occurring for a predetermined time period.

3. The method of claim 1, further comprising:
   reactivating the indicator light for a predetermined time period when a user input to the user interface assembly is detected after deactivation, the step of reactivating occurring while continuing the step of locking the appliance such that user inputs to the user interface assembly are prevented from altering operation of the appliance.

4. The method of claim 1, further comprising:
   reactivating the indicator light for a predetermined time period when power to the appliance is restored after a loss of power to the appliance.

5. The method of claim 1, further comprising:
   unlocking the appliance such that user inputs to the user interface assembly are permitted to alter operation of the appliance.

6. The method of claim 5, wherein unlocking of the appliance is based on a user input to the user interface assembly.

7. The method of claim 1, wherein locking of the appliance is based on a user input to the user interface assembly.

8. The method of claim 1, wherein locking of the appliance occurs automatically after a predetermined time period from detection of an inactive state of the appliance.

9. The method of claim 1, wherein locking of the appliance occurs automatically when power to the appliance is restored after a loss of power to the appliance.

10. The method of claim 1, wherein the user interface assembly comprises a touch screen.

11. The method of claim 1, wherein the appliance is a cooktop appliance.

12. A cooktop appliance,
    comprising: a cooking panel comprising a cooking zone;

a heating element positioned adjacent the cooking zone for heating a cooking utensil disposed on the cooking zone;

a user interface assembly; and a controller in communication with the user interface assembly and the heating element, the controller configured for:

locking the appliance such that user inputs to a user interface assembly of the appliance are prevented from altering operation of the appliance;

activating an indicator light when the appliance is locked; and deactivating the indicator light after a predetermined time period from activation of the indicator light, the step of deactivating occurring while continuing the step of locking the appliance such that user inputs to the user interface assembly are prevented from altering operation of the appliance; and wherein the controller is further configured for reactivating the indicator light at a predetermined time interval after deactivation, the step of reactivating occurring while continuing the step of locking the appliance such that user inputs to the user interface assembly are prevented from altering operation of the appliance, each reactivation occurring for a predetermined time period; or reactivating the indicator light for a predetermined time period when a user input to the user interface assembly is detected after deactivation, the step of reactivating occurring while continuing the step of locking the appliance such that user inputs to the user interface assembly are prevented from altering operation of the appliance.

13. The cooktop appliance of claim 12, wherein the controller is further configured for:

reactivating the indicator light at a predetermined time interval after deactivation, the step of reactivating occurring while continuing the step of locking the appliance such that user inputs to the user interface assembly are prevented from altering operation of the appliance, each reactivation occurring for a predetermined time period.

14. The cooktop appliance of claim 12, wherein the controller is further configured for:

reactivating the indicator light for a predetermined time period when a user input to the user interface assembly is detected after deactivation, the step of reactivating occurring while continuing the step of locking the appliance such that user inputs to the user interface assembly are prevented from altering operation of the appliance.

15. The cooktop appliance of claim 12, wherein the controller is further configured for reactivating the indicator light for a predetermined time period when power to the appliance is restored after a loss of power to the appliance.

16. The cooktop appliance of claim 12, wherein the controller is further configured for:

unlocking the appliance such that user inputs to the user interface assembly are permitted to alter operation of the appliance.

17. The cooktop appliance of claim 12, wherein locking of the appliance is based on a user input to the user interface assembly.

18. The cooktop appliance of claim 12, wherein locking of the appliance occurs automatically after a predetermined time period from detection of an inactive state of the appliance.

19. The cooktop appliance of claim 12, wherein locking of the appliance occurs automatically when power to the appliance is restored after a loss of power to the appliance.

20. The cooktop appliance of claim 12, wherein the user interface assembly comprises a touch screen.

* * * * *